April 4, 1950     C. H. SPARKLIN     2,502,489
CARBON DISK RESISTOR
Filed March 24, 1947
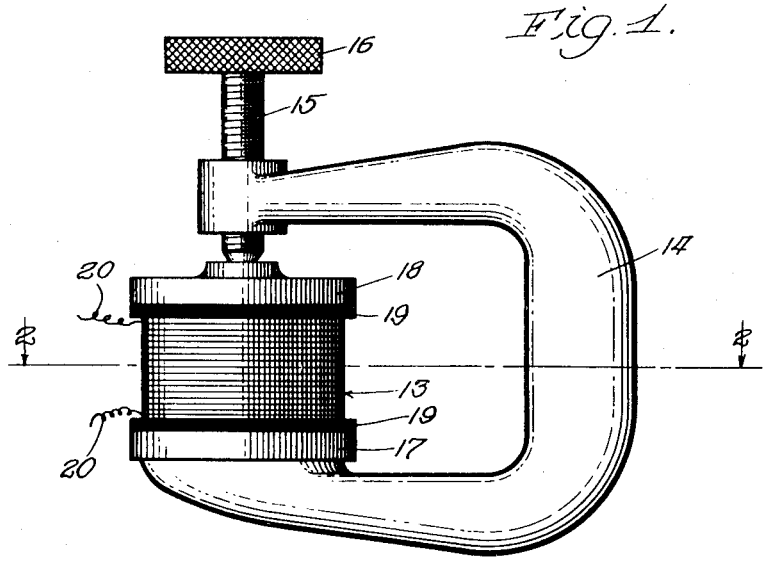
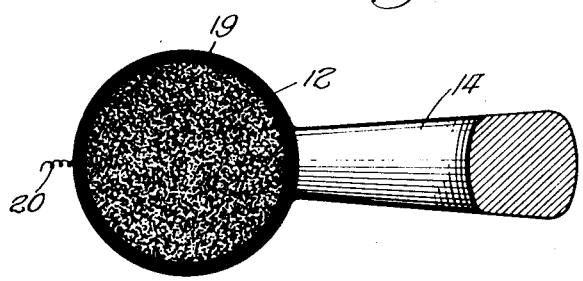
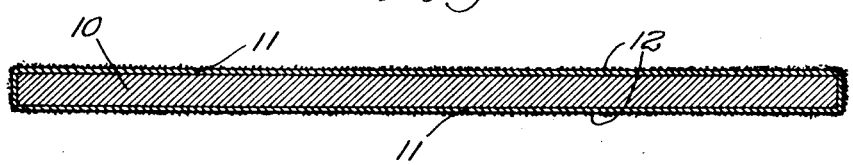
Inventor:
Charles H. Sparklin Patented Apr. 4, 1950

2,502,489

UNITED STATES PATENT OFFICE 2,502,489

CARBON DISK RESISTOR

Charles H. Sparklin, Chicago, Ill., assignor to Birtman Electric Co., a corporation of Illinois Application March 24, 1947, Serial No. 736,751

8 Claims. (Cl. 201—51)

This invention relates to an improved carbon disk of the type used in carbon piles wherein the electric current flow through the pile is dependent on the resistance therethrough as controlled by pressure on the pile.

Carbon piles have many applications in electrical work as the amount of current flowing through the pile may be easily regulated by varying pressure on the pile. The pile is ordinarily made up of a plurality of superposed thin carbon disks with the thickness of the piles and the dimensions of each disk depending upon the particular application of each pile. The carbon disks are ordinarily made of solid pieces of carbon cut in thin disk form. These must be handled quite carefully as they are quite brittle and easily broken. Also, they are relatively expensive as great care must be used in their manufacture.

I have invented a carbon disk that may be used in a carbon pile with each disk comprising a relatively thin wafer of metal, wood, plastic, or other strong material having a contacting portion of its surface covered with an adhesive in which are embedded particles of carbon. The particles are preferably arranged so that adjacent particles are in contact with each other and the surfaces are thickly covered. By using such disks, the resistance to breaking is very high and the disks are quite inexpensive. These disks are used in the same manner as the ordinary carbon disks and are arranged in a pile with the pile being connected to a source of electricity. Electrical flow through the pile is varied by varying the pressure on the pile.

The invention will be described as related to the embodiment shown in the accompanying drawings. Of the drawings: Fig. 1 is an elevation of a carbon pile made up of the new disks and a mounting thereof; Fig. 2 is a horizontal section taken along line 2—2 of Fig. 1; and Fig. 3 is an enlarged vertical section taken through one of the disks.

Each disk, as shown, is constructed of a thin substantially circular wafer 10 of some strong material preferably metal. The entire surface of this wafer is covered with an adhesive coating 11 in which is embedded finely divided particles 12 of carbon. The adhesive is one which will remain adherent without substantial softening or oxidizing to a relatively high temperature such as 250–350° F. The adhesive may be an animal or vegetable glue and non-thermoplastic. Among the adhesives that may be used are insulation varnish, phenolic resins, urea-formaldehyde resins, melamine-formaldehyde resins, and allyl resins. Of the adhesives that may be used, insulation varnish is superior as it does not soften even at extremely high temperatures.

The carbon particles may be any size desired, but are preferably very small so that good contact may be had between adjacent particles. It is preferred that the particles have a maximum diameter of not more than about $\frac{1}{32}$ of an inch.

In making the disks, the wafers are coated with the adhesive and then before the adhesive is dried and while it is in a soft, adherent condition it is completely covered with the carbon particles. The adhesive is then dried or otherwise solidified and the carbon particles are tightly bound to the adhesive.

In using the disks, they are arranged in a pile 13, as shown in Fig. 1, and held by any suitable means such as a clamp 14. Pressure may be applied to the pile by means of a screw 15 having a knurled knob 16 on the end thereof. The pile is held between a lower plate 17 integrally with the clamp and an upper plate 18 that is movable and against which the end of the screw 15 presses. The lower and upper plates 17 and 18 are separated from the carbon pile 13 by insulation disks 19 of any good insulating material such as hard rubber. The top and bottom of the pile 13 have electrical leads 20 attached thereto by means of which electric current may be caused to flow through the pile. The resistance to flow of the current may be varied by varying the pressure on the pile through the screw 15.

Having described my invention as related to the embodiment shown in the accompanying drawings, it is my intention that the invention be not limited by any of the details of description, but rather be construed broadly within its spirit and scope as set out in the accompanying claims.

I claim:

1. A carbon pile comprising a plurality of superposed disks with each disk comprising a wafer having a contacting portion of its surface covered with an adhesive in which are embedded particles of carbon.

2. A carbon pile comprising a plurality of superposed disks with each disk comprising a wafer having a contacting portion of its surface covered with an adhesive in which are embedded particles of carbon, said particles being in contacting relationship with each other.

3. A carbon pile comprising a plurality of superposed disks with each disk comprising a wafer having a contacting portion of its surface covered with a non-thermoplastic adhesive in which are embedded particles of carbon.

4. The carbon pile of claim 3 wherein the adhesive is non-softening to a temperature of at least 350° F.

5. The carbon pile of claim 3 wherein each wafer is completely covered on all sides with said adhesive and carbon particles.

6. A carbon pile comprising a plurality of superposed disks with each disk comprising a wafer having its entire surface covered with a non-thermoplastic adhesive in which are embedded contacting particles of carbon, said adhesive being non-softening to a temperature of at least 350° F. and said particles being in contacting relationship with each other.

7. The carbon pile of claim 6 wherein each disk is metal.

8. The carbon pile of claim 6 wherein the adhesive is insulation varnish.

CHARLES H. SPARKLIN.

REFERENCES CITED

The following references are of record in the file of this patent:

UNITED STATES PATENTS

| Number | Name | Date |
|---|---|---|
| 1,335,022 | Papini | Mar. 30, 1920 |
| 1,929,396 | Benkelman | Oct. 3, 1933 |
| 2,179,566 | Stoekle | Nov. 14, 1939 |